United States Patent
Zhao et al.

(10) Patent No.: US 10,600,312 B2
(45) Date of Patent: Mar. 24, 2020

(54) SYSTEMS AND METHODS FOR SECURITY SENSOR CONFIGURATION

(71) Applicant: Honeywell International Inc., Morristown, NJ (US)

(72) Inventors: Min Chao Zhao, Shanghai (CN); Yu Lin Li, Shanghai (CN); Ting Li, Shanghai (CN)

(73) Assignee: ADEMCO INC., Golden Valley, MN (US)

(*) Notice: Subject to any disclaimer, the term of this patent is extended or adjusted under 35 U.S.C. 154(b) by 0 days.

(21) Appl. No.: 15/851,170

(22) Filed: Dec. 21, 2017

(65) Prior Publication Data

US 2019/0197875 A1    Jun. 27, 2019

(51) Int. Cl.
*G08B 25/00* (2006.01)
*H04L 29/08* (2006.01)
*G08B 25/10* (2006.01)
*G08B 25/14* (2006.01)

(52) U.S. Cl.
CPC .......... *G08B 25/008* (2013.01); *G08B 25/10* (2013.01); *H04L 67/12* (2013.01); *G08B 25/14* (2013.01)

(58) Field of Classification Search
None
See application file for complete search history.

(56) References Cited

U.S. PATENT DOCUMENTS

| | | | |
|---|---|---|---|
| 6,198,389 B1 | 3/2001 | Buccola | |
| 7,528,711 B2 | 5/2009 | Kates | |
| 8,185,049 B2 * | 5/2012 | Zhang | H04N 21/4334 455/41.2 |
| 10,169,983 B2 * | 1/2019 | H. M. | G08B 25/014 |
| 2002/0077077 A1 * | 6/2002 | Rezvani | H04L 63/08 455/410 |
| 2002/0126137 A1 | 9/2002 | Kaestner, Jr. | |
| 2004/0090327 A1 * | 5/2004 | Soloway | G08B 13/08 340/545.1 |
| 2006/0209176 A1 * | 9/2006 | Nakamura | G08B 25/10 348/14.01 |
| 2008/0252598 A1 * | 10/2008 | Fan | G06F 3/0346 345/157 |

(Continued)

FOREIGN PATENT DOCUMENTS

AU    615798 B2    10/1991
EP    3 136 353 A1    3/2017

(Continued)

OTHER PUBLICATIONS

English language translation of bibliographic data and abstract for KR100848929 (B1).

(Continued)

*Primary Examiner* — Chico A Foxx
(74) *Attorney, Agent, or Firm* — Husch Blackwell LLP

(57) ABSTRACT

Systems and methods for configuring a security sensor are provided. Some methods can include receiving user input identifying a configuration setting of the security sensor through a user input device located on the security sensor, identifying the configuration setting based on the user input, transmitting a registration message to a security system control panel identifying the configuration setting, and operating in accordance with the configuration setting.

20 Claims, 3 Drawing Sheets

(56) References Cited

U.S. PATENT DOCUMENTS

| | | | |
|---|---|---|---|
| 2010/0145479 A1* | 6/2010 | Griffiths | G01D 21/00 700/17 |
| 2010/0219948 A1* | 9/2010 | Egawa | G08B 21/12 340/531 |
| 2012/0203841 A1* | 8/2012 | Cavalcanti | G05B 19/4185 709/204 |
| 2012/0286951 A1 | 11/2012 | Hess et al. | |
| 2014/0036728 A1* | 2/2014 | An | H04W 40/02 370/254 |
| 2014/0258727 A1* | 9/2014 | Schmit | G06F 21/445 713/182 |
| 2014/0288912 A1* | 9/2014 | Inoue | H04L 67/12 703/14 |
| 2014/0375436 A1* | 12/2014 | Rezvani | G06F 21/31 340/12.23 |
| 2015/0221209 A1 | 8/2015 | Janardhanan et al. | |
| 2015/0281872 A1* | 10/2015 | Pierrel | H04W 4/38 702/188 |
| 2015/0332585 A1* | 11/2015 | H.M. | G08B 25/014 704/225 |
| 2016/0183037 A1* | 6/2016 | Grohman | H04W 4/30 709/221 |
| 2016/0189528 A1* | 6/2016 | Lee | G08B 25/008 340/541 |
| 2016/0326765 A1* | 11/2016 | Barbret | E04H 15/02 |
| 2017/0013069 A1* | 1/2017 | Grohman | H04L 67/22 |
| 2017/0078018 A1* | 3/2017 | Walma, Jr. | H04B 10/40 |
| 2017/0119207 A1* | 5/2017 | Kim | A23L 5/15 |
| 2017/0238192 A1* | 8/2017 | Lee | H04W 4/70 455/500 |
| 2017/0240079 A1* | 8/2017 | Petrovski | B60N 2/02 |

FOREIGN PATENT DOCUMENTS

| | | |
|---|---|---|
| KR | 10-0848929 | 8/2008 |
| WO | WO 00/49589 | 8/2000 |

OTHER PUBLICATIONS

English language translation of Patent Record Full View of KR848929B1.

Alarm Systems—Custom Security Systems, accessed electronically on Oct. 27, 2017, http://customsecuritysystems.com/home-security/alarm-systems/.

Extended European search report for corresponding EP patent application 18192491.1, dated Mar. 20, 2019.

* cited by examiner

SYSTEMS AND METHODS FOR SECURITY SENSOR CONFIGURATION

FIELD

The present invention relates generally to security systems. More particularly, the present invention relates to systems and methods for configuring a security sensor within a security system.

BACKGROUND

Security systems are known to detect threats within a secured area, and such threats include events that represent a risk to human safety or a risk to assets.

Security systems typically include one or more security sensors that detect the threats within the secured area. For example, smoke, motion, and/or intrusion sensors are distributed throughout the secured area in order to detect the threats.

For less sophisticated users, configuring the security sensors of a security system can be quite difficult. For example, known security sensors are configured within the security system using a web-based interface or a mobile application. While these configuration methods successfully configure the security sensors, many users, especially residential customers, find such a configuration process daunting or difficult. As such, there is a need for a simpler and more efficient system and method for configuring the security sensors within the security system.

DETAILED DESCRIPTION

Figure 1:
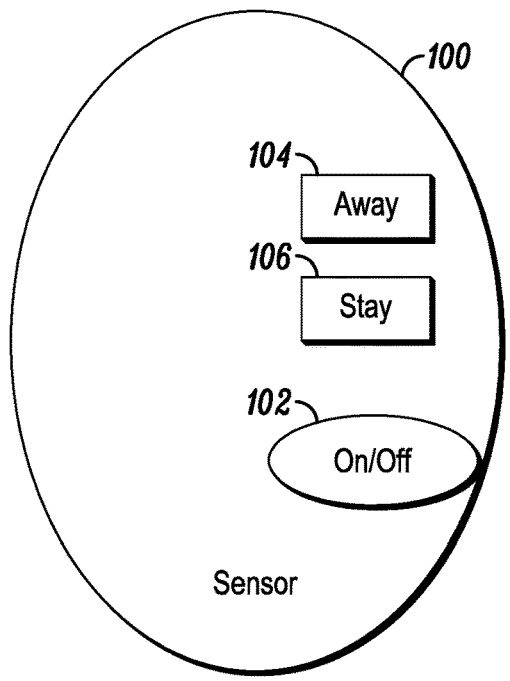
FIG. 1 is a block diagram of a security sensor with configuration buttons in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for configuring a security sensor within a security system. In some embodiments, the security sensor can include one or more buttons or one or more toggles that can automatically set a working mode for the security sensor, such as a total alarm mode or a partial alarm mode. For example, the total alarm mode can configure the security sensor to be active when the security system is operating with either an arm-away status or an arm-stay status, and the partial alarm mode can configure the security sensor to be active only when the security system is operating with the arm-away status. In some embodiments, the security system operating with the arm-away status can include activating all of the security sensors in a secured area, and in some embodiments, the security system operating with the arm-stay status, such as when a homeowner or other authorized person is present within the secured area, can include deactivating the security sensors located in an internal portion of the secured area (e.g. motion sensors, internal security cameras) and activating the security sensors along a periphery of the secured area or at potential avenues of ingress into the secured area (e.g. windows, doors, etc.).

In some embodiments, a user can place the security sensor at a desired location, press a single first button of the one or more buttons on the security sensor to set the security sensor to a first working mode, and turn on the security sensor. Furthermore, in some embodiments, the security sensor can identify the first working mode for the security sensor based on the first button that was pressed by the user and can automatically register with a control panel of the security system in accordance with the first working mode.

In some embodiments, the user may reallocate or reconfigure the security sensor by pressing a second button of the one or more buttons on the security sensor that is different than the first button and resetting the security sensor. For example, resetting the security sensor can cause the security sensor to re-register with the control panel in accordance with a second working mode that corresponds to the second button (e.g. the security sensor can change from the total alarm mode to the partial alarm mode). Additionally or alternatively, the user can add a new security sensor to the security system by purchasing the new security sensor and configuring the new security sensor using the one or more buttons. Additionally or alternatively, the user can remove the security sensor or the new security sensor from the security system by pressing an on/off button on the security sensor or the new security system.

In some embodiments, the security sensor may include at least an on/off button and a working mode selection input on an exterior of a housing of the security sensor. For example, the working mode selection input may include a plurality of buttons, wherein each of the plurality of buttons corresponds to a respective working mode for the security sensor, or a toggle switch, wherein each of a plurality of positions of the toggle switch corresponds to the respective working mode for the security sensor. The user may activate or deactivate the security sensor by pressing the on/off button and may configure the security sensor by pressing or toggling the working mode selection input. In some embodiments, the security sensor may also include an LED indicator or a display that can shine a light or display text indicative of the working mode for the security sensor selected by the user.

FIG. 1 is a block diagram of a security sensor 100 in accordance with disclosed embodiments. As shown in FIG. 1, the security sensor 100 can include an on/off button 102, an away button 104, and a stay button 106. User input selecting the on/off button 102 can activate or deactivate the security sensor 100, user input selecting the away button 104 can cause the security sensor 100 to register with a control panel of a security sensor in accordance with a total alarm mode, and user input selecting the stay button 104 can cause the security sensor 100 to register with the control panel of the security system in accordance with a partial alarm mode. For example, the total alarm mode can cause the security sensor 100 to be active and detect threats when the control panel of the security system is operating either with an alarm-away status or an alarm-stay status, and the partial alarm mode can cause the security sensor 100 to be active and detect threats only when the control panel of the security system is operating with the alarm-away status.

Although not illustrated, in some embodiments, the security sensor 100 can additionally or alternatively include a display, and in some embodiments the security sensor 100 can additionally or alternatively include a single working mode selection button. For example, user input selecting the single working mode selection button can cause the security sensor 100 to shuffle through a plurality of working modes available to the security sensor 100, each of which can be displayed on the display for selection by a user. In some embodiments, the display may include one or more LEDs, an LCD screen, or the like, and in some embodiments, the single working mode selection button may also be displayed on a touch screen of the display.

Figure 2:
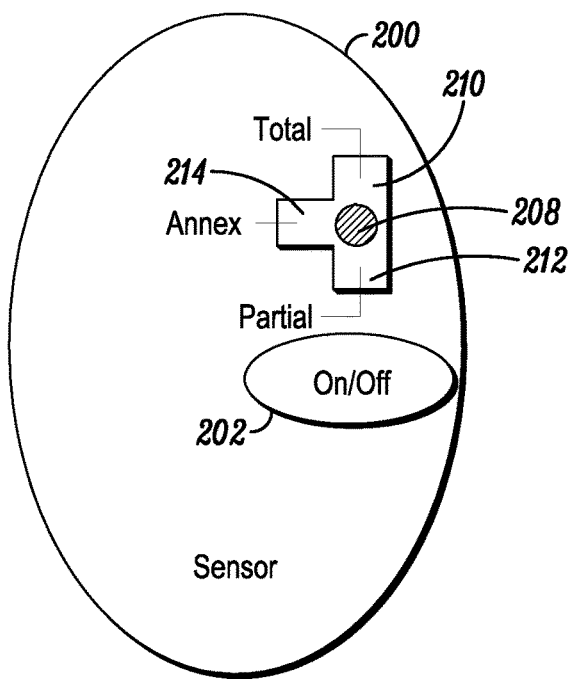
FIG. 2 is a block diagram a security sensor with a configuration toggle in accordance with disclosed embodiments.

FIG. 2 is a block diagram of a security sensor 200 in accordance with disclosed embodiments. As shown in FIG. 2, the security sensor 200 can include an on/off button 202 and a working mode toggle 208 that can be moved to a total alarm mode position 210, a partial alarm mode position 212, or an annex mode position 214. User input selecting the on/off button 202 can activate or deactivate the security sensor 200, user input moving the working mode toggle 206 to the total alarm mode position 210 can cause the security sensor 200 to register with a control panel of a security system in accordance with a total alarm mode, user input moving the working mode toggle 206 to the partial alarm mode position 212 can cause the security sensor 200 to register with the control panel of the security system in accordance with a partial alarm mode, and user input moving the working mode toggle 206 to the annex mode position 212 can cause the security sensor 200 to register with the control panel of the security system in an annex zone of a secured area monitored by the security system. For example, the user input moving the working mode toggle 206 to the annex mode position 212 can cause the security sensor 200 to instruct the control panel to disassociate the security sensor 200 from a main zone of the secured area, such as a home zone, and associate the security sensor 200 with the annex zone of the secured area, such as a garage zone. In some embodiments, while the user input moving the working mode toggle 206 to the annex mode position 212 can cause the security sensor 200 to reregister its ambient zone with the control panel, but such user input can refrain from changing a working mode of the security sensor 200 (e.g. the security sensor 200 can remain in the total alarm mode despite changing zones). In some embodiments, the working mode toggle 206 can have a T-shape (FIG. 2) or be linear.

Figure 3:
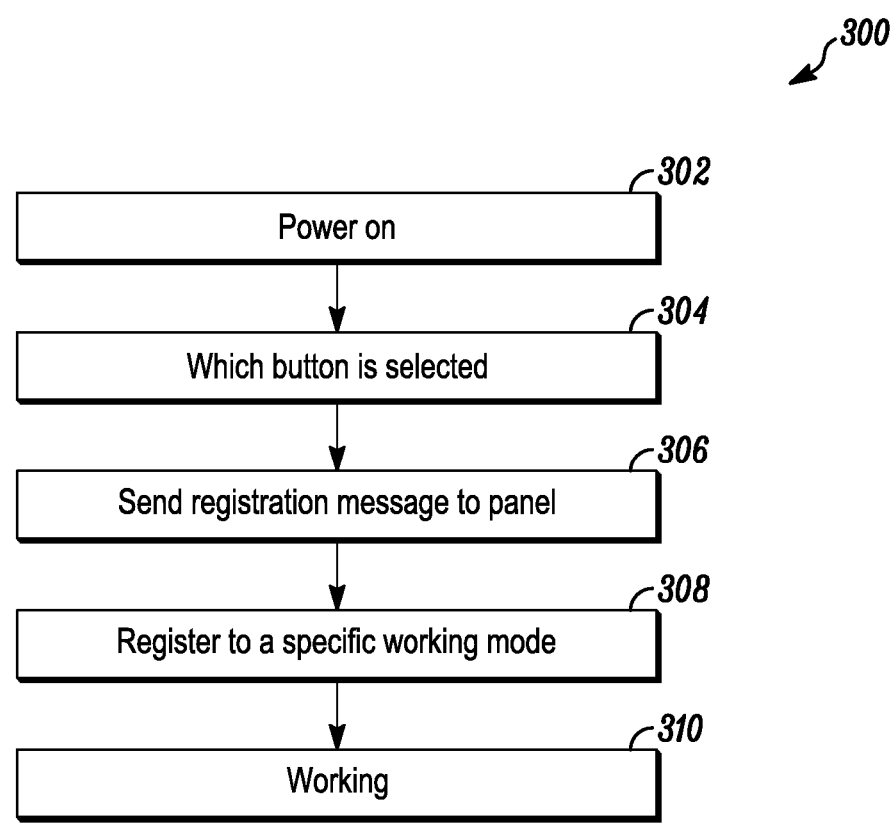
FIG. 3 is a flow diagram of a method in accordance with disclosed embodiments.

FIG. 3 is a flow diagram of a method 300 in accordance with disclosed embodiments. As seen in FIG. 3, the method 300 can include a security sensor (e.g. 100, 200) powering on as in 302, the security sensor receiving user input and identifying a button or a position of a toggle selected by the user input as in 304, and the security sensor sending a registration message to a control panel as in 306. For example, in some embodiments, the registration message can identify a working mode of the security sensor that is associated with the button or the position of the toggle selected by the user input. Subsequently, the method 300 may include the security sensor registering with the control panel in accordance with the working mode of the security sensor that is associated with the button or the position of the toggle selected by the user input as in 308, and the security sensor operating in accordance with the working mode as in 310.

Figure 4:
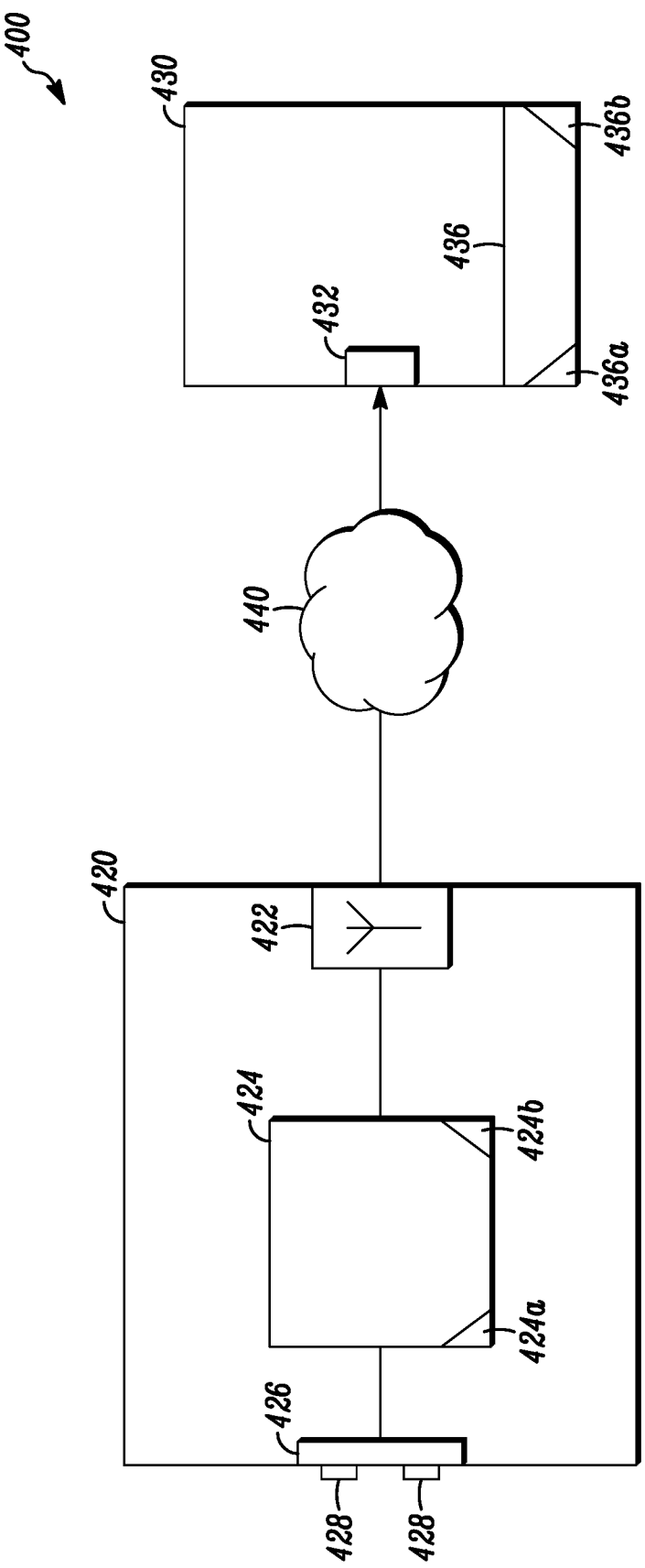
FIG. 4 is a block diagram of a system in accordance with disclosed embodiments.

FIG. 4 is a block diagram of a system 400 in accordance with disclosed embodiments. As shown in FIG. 4, the system 400 can include a security sensor 420 wirelessly communicating with a control panel 430 through a network 440. In some embodiments, the security sensor 420 may include an intrusion detector, a fire detector, a gas or carbon monoxide detector, a surveillance camera, a motion detector, or any other security sensor as would be known by those of skill in the art.

The security sensor 420 can include one or more buttons 428, a transceiver 422, user input circuitry 426, control circuitry 424, one or more programmable processors 424a, and executable control software 424b as would be understood by one of ordinary skill in the art. The executable control software 424b can be stored on a transitory or non-transitory computer readable medium, including, but not limited to local computer memory, RAM, optical storage media, magnetic storage media, flash memory, and the like. In some embodiments, some or all of the control circuitry 424, the programmable processor 424a, and the control software 424b can execute and control the methods described herein.

The control panel 430 can also include a transceiver 432, control circuitry 436, one or more programmable processors 436a, and executable control software 436b as would be understood by one of ordinary skill in the art. The executable control software 436b can be stored on a transitory or non-transitory computer readable medium, including, but not limited to local computer memory, RAM, optical storage media, magnetic storage media, flash memory, and the like.

In some embodiments, the user input circuitry 426 can receive user input selecting one or more of the buttons 428, can identify which of the buttons is selected by the user input, and can transmit a signal to the control circuitry 424 identifying a working mode associated with the selected button. In some embodiments, the control circuitry 424, the programmable processor 424a, and the control software 424b can receive the signal from the user input circuitry 426 identifying which of the buttons 428 is selected by the user input and can transmit a registration message to the control panel 430 through the network 440 in accordance with the signal received from the user input circuitry 426. For example, when the user input selects a first of the buttons 428, the control circuitry 424, the programmable processor 424a, and the control software 424b can transmit a first registration message to the control panel 430 to cause the security sensor 200 to register with the control panel 430 in accordance with a first working mode, but when the user input selects a second of the buttons 428, the control circuitry 424, the programmable processor 424a, and the control software 424b can transmit a second registration message to the control panel 430 to cause the security sensor 200 to register with the control panel 430 in accordance with a second working mode.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

receiving user input identifying one of a plurality of working modes for a security sensor through a user input device located on the security sensor, wherein the security sensor communicates with a security system control panel and detects threats within a secured area when active;

identifying the one of the plurality of working modes based on the user input;

transmitting a registration message to the security system control panel identifying the one of the plurality of working modes; and operating in accordance with the one of the plurality of working modes, wherein a first of the plurality of working modes corresponds to a partial alarm mode that configures the security sensor to be active when the security system control panel is operating with an arm-away status, and wherein a second of the plurality of working modes corresponds to a total alarm mode that configures the security sensor to be active when the security system control panel is operating with either the arm-away status or an arm-stay status.

2. The method of claim 1 wherein the user input device includes one or more physical buttons.

3. The method of claim 2 wherein the one or more physical buttons include an on/off button.

4. The method of claim 2 wherein the one or more physical buttons include an away button and a stay button.

5. The method of claim 4 wherein the away button corresponds to the total alarm mode for the security sensor.

6. The method of claim 4 wherein the stay button corresponds to the partial alarm mode for the security sensor.

7. The method of claim 1 wherein the user input device includes a physical toggle movable to a plurality of toggle positions.

8. The method of claim 7 wherein a first of the plurality of toggle positions corresponds to the total alarm mode for the security sensor.

9. The method of claim 8 wherein a second of the plurality of toggle positions corresponds to the partial alarm mode for the security sensor.

10. The method of claim 9 wherein a third of the plurality of toggle positions corresponds to an annex mode for the security sensor.

11. A security sensor comprising:

a user input device located on an exterior of a housing;

a transceiver in communication with a security system control panel;

a programmable processor for detecting threats within a secured area when the security sensor is active; and executable control software stored on a non-transitory computer readable medium, wherein the user input device receives user input identifying one of a plurality of working modes for the security sensor, wherein the programmable processor and the executable control software identify the one of the plurality of working modes based on the user input, wherein the transceiver transmits a registration message to the security system control panel identifying the one of the plurality of working modes, wherein the programmable processor and the executable control software operate in accordance with the one of the plurality of working modes, wherein a first of the plurality of working modes corresponds to a partial alarm mode that configures the security sensor to be active when the security system control panel is operating with an arm-away status, and wherein a second of the plurality of working modes corresponds to a total alarm mode that configures the security sensor to be active when the security system control panel is operating with either the arm-away status or an arm-stay status.

12. The security sensor of claim 11 wherein the user input device includes one or more physical buttons.

13. The security sensor of claim 12 wherein the one or more physical buttons include an on/off button.

14. The security sensor of claim 12 wherein the one or more physical buttons include an away button and a stay button.

15. The security sensor of claim 14 wherein the away button corresponds to the total alarm mode for the security sensor.

16. The security sensor of claim 14 wherein the stay button corresponds to the partial alarm mode for the security sensor.

17. The security sensor of claim 11 wherein the user input devices includes a physical toggle moveable to a plurality of toggle positions.

18. The security sensor of claim 17 wherein a first of the plurality of toggle positions corresponds to the total alarm mode for the security sensor.

19. The security sensor of claim 18 wherein a second of the plurality of toggle positions corresponds to the partial alarm mode for the security sensor.

20. The security sensor of claim 19 wherein a third of the plurality of toggle positions corresponds to an annex mode for the security sensor.

* * * * *